(12) United States Patent
Chen et al.

(10) Patent No.: US 10,281,268 B1
(45) Date of Patent: May 7, 2019

(54) AUTOMATED AND ACCURATE HIGH-THROUGHPUT SLIDER-LEVEL FLATNESS INSPECTION

(71) Applicant: Seagate Technology LLC, Cupertino, CA (US)

(72) Inventors: Zhiyu Chen, Eagan, MN (US); Andrew D. Habermas, Bloomington, MN (US); Kurtis Dean Loken, Bloomington, MN (US); Gary J. Kunkel, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/958,646

(22) Filed: Apr. 20, 2018

(51) Int. Cl.
*G01B 11/30* (2006.01)
*G11B 5/60* (2006.01)

(52) U.S. Cl.
CPC .......... *G01B 11/306* (2013.01); *G01B 11/303* (2013.01); *G11B 5/6082* (2013.01)

(58) Field of Classification Search
CPC ..... G01B 11/306; G01B 11/303; G01B 11/24; G01B 11/1441
See application file for complete search history.

(56) References Cited

U.S. PATENT DOCUMENTS

| | | | |
|---|---|---|---|
| 5,418,363 A | 5/1995 | Elings et al. | |
| 5,991,461 A | 11/1999 | Schmucker et al. | |
| 6,449,048 B1 | 9/2002 | Olszak | |
| 6,662,069 B1 | 12/2003 | Khlif | |
| 7,143,005 B2 | 11/2006 | Dahlen et al. | |
| 7,406,860 B2 | 8/2008 | Zhou et al. | |
| 7,489,407 B2 | 2/2009 | Hill et al. | |
| 7,515,305 B2 | 4/2009 | Mizes | |
| 7,684,956 B2 | 3/2010 | Dahlen et al. | |
| 7,770,231 B2 | 8/2010 | Prater et al. | |
| 7,770,439 B2 | 8/2010 | Mininni | |
| 8,646,109 B2 | 2/2014 | Hu et al. | |
| 8,739,309 B2 | 5/2014 | Hu et al. | |
| 8,881,311 B2 | 11/2014 | Raschke et al. | |
| 9,105,282 B1 | 8/2015 | Puttichaem et al. | |
| 9,134,340 B2 | 9/2015 | Humphris | |

(Continued)

OTHER PUBLICATIONS

West et al., "A Guide to AFM Image Artifacts", Pacific Nanotechnology, Inc. (12 pages).

(Continued)

*Primary Examiner* — Jonathan M Hansen
(74) *Attorney, Agent, or Firm* — Kagan Binder, PLLC

(57) ABSTRACT

A method includes receiving an image of a surface of a slider bar from an interferometer, where the slider bar includes at least two sliders, and where the image includes image data according to at least two image data channels for a slider bar surface and the at least two sliders. The method also includes generating a slider bar map of the surface of the slider bar based upon the image data of the image, where the slider bar map includes at least two data channels and ascertaining a plurality of individual slider surface maps based on a number of sliders included on the slider bar, where the ascertaining is also based upon the slider bar map having the at least two data channels. The method also includes segmenting the slider bar map according to the plurality of individual slider surface maps.

20 Claims, 11 Drawing Sheets

(56) References Cited

U.S. PATENT DOCUMENTS

| | | | |
|---|---|---|---|
| 9,150,415 | B2 | 10/2015 | Zhou et al. |
| 9,316,917 | B2 | 4/2016 | Arai |
| 9,535,085 | B2 | 1/2017 | Stan et al. |
| 9,588,136 | B2 | 3/2017 | Hu et al. |
| 9,995,571 | B1* | 6/2018 | Loken ............... G01B 11/2441 |
| 2002/0179861 | A1 | 12/2002 | Khlif |
| 2008/0174784 | A1 | 7/2008 | Colonna De Lega et al. |
| 2015/0247881 | A1 | 9/2015 | Su et al. |
| 2015/0362309 | A1* | 12/2015 | Quaedackers ..... G01B 11/2441 702/166 |
| 2016/0027194 | A1 | 1/2016 | Zuiderweg et al. |

OTHER PUBLICATIONS

Fantner, "Atomic Force Microscopy", Advanced Bioengineering Methods Laboratory, École Polytechnique Fédérale De Lausanne (34 pages).

"Atomic-force microscopy", Wikipedia, retrieved on Mar. 8, 2017 from https://en.wikipedia.org/wiki/Atomic-force_microscopy (17 pages).

Chen et al., "Enhancement and recovery in atomic force microscopy images" (18 pages).

François Riguet, Gwyddion Tutorial #1, available at http://gwyddion.net/presentations/tutorial-Gwyddion-basic-data-correction-Francois-Riguet-2012.pdf (13 pages).

Klapetek et al., "Gwyddion user guide", available at http://gwyddion.net/documentation/user-guide-en/ (184 pages).

Ando et al., "High-speed atomic force microscopy for observing dynamic biomolecular processes", J. Mol. Recognit. Sep. 27, 2007; 20: pp. 448-458.

Haugstad, Greg. "Overview of Atomic Force Microscopy." de Atomic Force Microscopy (2012) (18 pages).

Ando et al., "High-speed Atomic Force Microscopy for Nano-visualization of Dynamic Biomolecular Processes", Progress in Surface Science 83, pp. 337-437 (2008).

"Bruker Stylus and 3D Microscope Systems—Solutions for Semi-conductor Application," Bruker Nano Surfaces Division, (60 pages), Sep. 25, 2013.

* cited by examiner

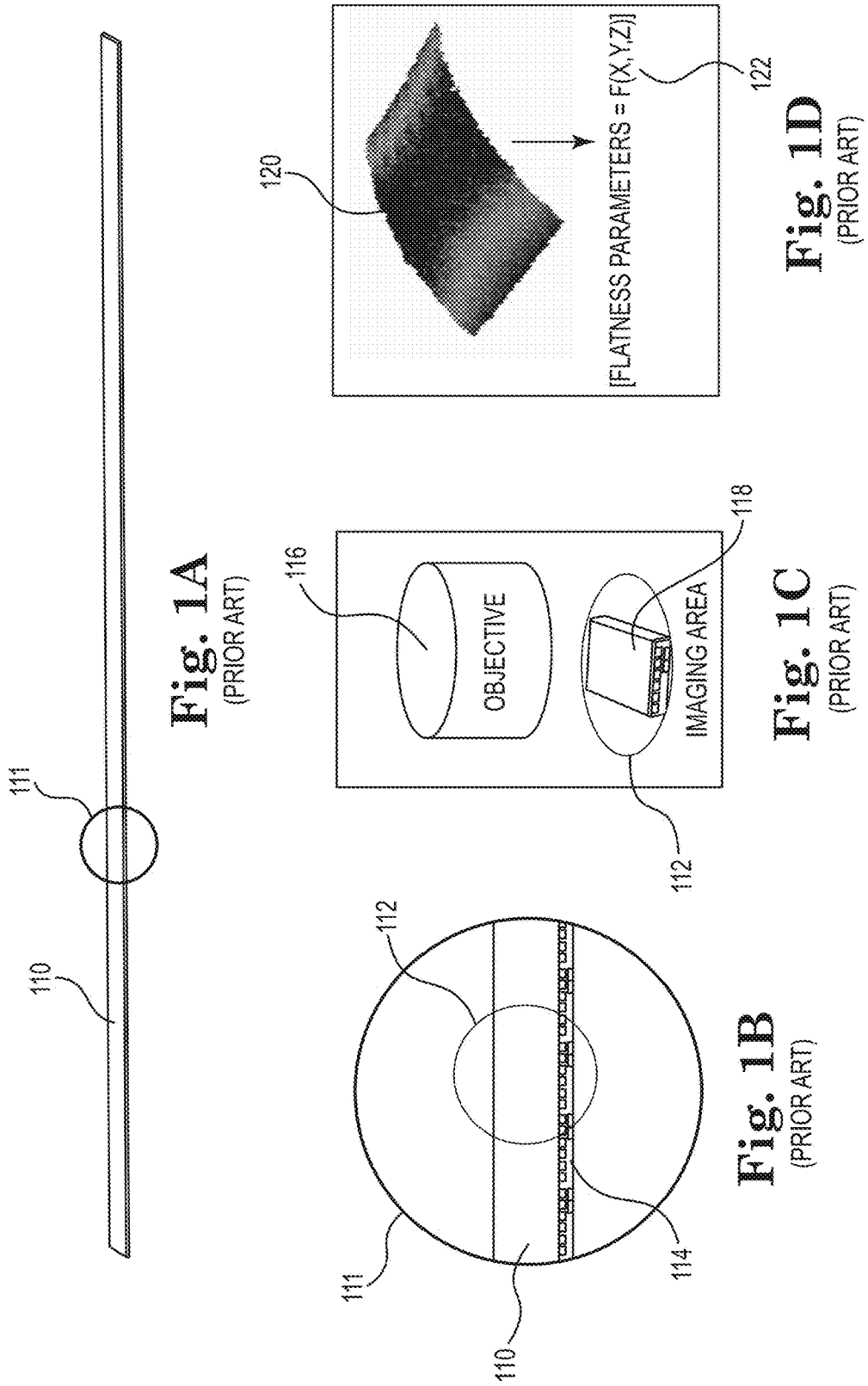

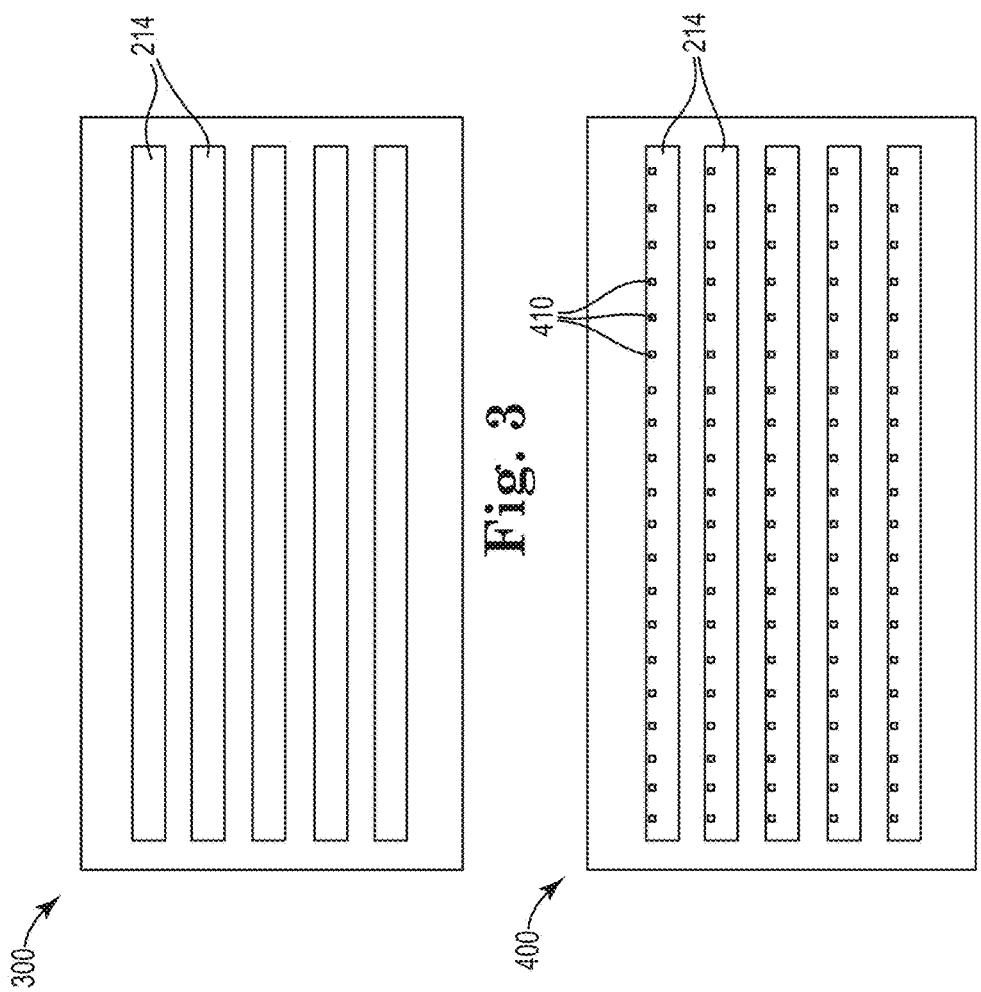

AUTOMATED AND ACCURATE HIGH-THROUGHPUT SLIDER-LEVEL FLATNESS INSPECTION

BACKGROUND

Aspects of the present disclosure are directed to slider fabrication, and in particular to an improved manner of measuring flatness of a slider surface.

Sliders can be used in storage devices, such as hard-disk drives. Slider are provided with air bearing features that controllably affect the manner by which the slider "flies" at a fly height on an aerodynamic air bearing created by a spinning disk, forming a head-media separation distance between the slider and the disk. Specifically, the aerodynamic and topographical (height-related) properties of the slider and a slider surface thereof influence the fly height in addition to pitch, roll, head-media separation distance, and other important features of the hard-disk drive.

Sliders generally do not have desired, ideal, or uniform flatness, and may have surface feature imperfections for a variety of reasons. One way to increase performance and to reduce the head-media separation distance is to better flatten or reduce the roughness (and thus increasing the flatness) of certain of the slider surfaces, in particular an air bearing surface of the slider.

SUMMARY

According to a first aspect of the present disclosure, a method of measuring one or more surface features is disclosed. The method includes receiving an image of a surface of a slider bar from an interferometer, where the slider bar includes at least two sliders selected from a plurality of sliders, and where the image includes image data according to at least two image data channels for a slider bar surface and the included at least two sliders. The method also includes generating a slider bar map of the surface of the slider bar based upon the image data of the image, where the slider bar map includes at least two data channels related to the slider bar. The method also includes ascertaining a plurality of individual slider surface maps based at least in part on a number of sliders included on the slider bar, where the ascertaining is also based upon the slider bar map having the at least two data channels. The method also includes segmenting the slider bar map according to the plurality of individual slider surface maps.

According to a second aspect of the present disclosure, an apparatus is disclosed. The apparatus includes a processor operatively coupled to a memory. The apparatus also includes a large-aperture interferometer. The apparatus also includes a slider cropping mask configured to be positioned proximate to a slider bar. The apparatus also includes a controller. According to the second aspect, the controller is configured to receive an image of a surface of the slider bar from the interferometer, where the slider bar includes at least two sliders selected from a plurality of sliders, and where the image includes image data according to at least two image data channels for a slider bar surface and the included at least two sliders. According to the second aspect, the controller is also configured to generate a slider bar map of surface of the slider bar based upon the image data of the image, where the slider bar map includes at least two data channels related to the slider bar. According to the second aspect, the controller is also configured to ascertain a plurality of individual slider surface maps based at least in part of a number of sliders included on the slider bar, where the ascertaining is also based upon the slider bar map having the at least two data channels. According to the second aspect, the controller is also configured to segment the slider bar map according to the plurality of individual slider surface maps.

According to a third aspect of the present disclosure, a computer program product for measuring slider surface features is disclosed. The computer program product includes a computer-readable storage device having a computer-readable program stored therein, where the computer-readable program, when executed on a computing device improves the computing device and causes the computing device to receive an image of a surface of the slider bar from a large-aperture interferometer, where the slider bar includes at least two sliders selected from a plurality of sliders, and where the image includes image data according to at least two image data channels for a slider bar surface and the included at least two sliders. The computer-readable program, when executed on the computing device improves the computing device and causes the computing device to generate a slider bar map of a surface of the slider bar based upon the image data of the image, where the slider bar map includes at least two data channels related to the slider bar. The computer-readable program, when executed on the computing device improves the computing device and causes the computing device to ascertain a plurality of individual slider surface maps based at least in part of a number of sliders included on the slider bar, where the ascertaining is also based upon the slider bar map having the at least two data channels. The computer-readable program, when executed on the computing device improves the computing device and causes the computing device to segment the slider bar map according to the plurality of individual slider surface maps.

BRIEF DESCRIPTION OF THE DRAWINGS

FIGS. 1A-1D show steps on a conventional method for sequentially measuring multiple sliders included in a slider bar.

FIG. 3 shows an image that represents a plurality of slider bars as viewed according to a surface data channel only.

FIG. 4 shows an image the represents a plurality of slider poles, revealed on each slider bar, according to various embodiments.

DETAILED DESCRIPTION

Figure 2C:
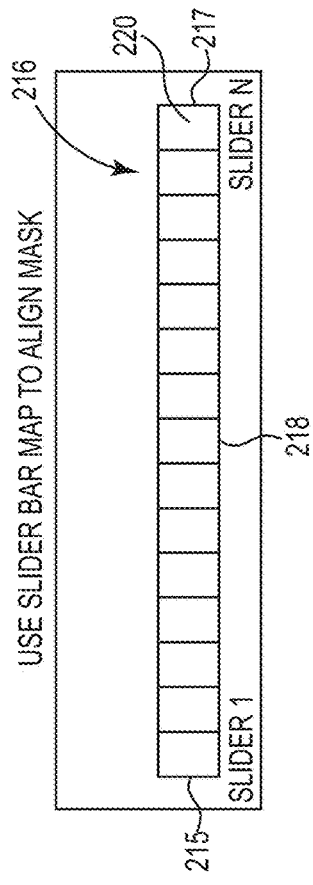
FIG. 2C shows that a slider bar map can be used to align a cropping mask relative to a single slider bar, according to various embodiments.

Aspects of the present disclosure are directed to slider fabrication, and in particular to an improved manner of measuring flatness of one or more slider surface. Improvements of the present disclosure over conventional surface metrology systems include gains in speed and efficiency. Yet other benefits can include more accurate alignment and adjustment of slider cropping masks using detected poles within sliders composing a slider bar. These and other benefits are described in greater detail with respect to the description, below.

Sliders are fabricated for utilization within data storage disk drives (e.g., hard-disk drives [HDDs]) for positioning a magnetic head including read/write elements relative to one or more spinning disks. Each slider typically includes read/write elements along with electrical contacts to facilitate electrical connection with an electronic data control system. Sliders are also provided with air bearing features that controllably affect the manner by which the slider "flies" at a fly height on an aerodynamic air bearing created by a spinning disk, forming a head-media separation distance between the slider and the disk. Specifically, the aerodynamic and topographical (height-related) properties of the slider and a slider surface thereof influence the fly height in addition to pitch, roll, head-media separation distance, and other important features of the hard-disk drive. The aforementioned features range in scale from nanometer to millimeter size.

The density of data tracks on disk surfaces has been increasing in order to obtain greater data storage within a given disk surface area. This surface storage density is commonly referred to as areal density. Specifically, the linear density of the data tracks themselves has increased and the data tracks have become narrower. The data tracks have become more tightly packed and the radial spacing between data tracks has decreased in order to increase areal density. In order to continue to improve the areal density and to improve read/write performance of the hard-disk drive, it is desirable to reduce the head-media separation distance between the read/write elements on the slider and the disk. A smaller head-media separation distance may increase the magnetic recording density at least in part by improving an associated signal-to-noise ratio and associated read/write precision of the magnetic head vis-à-vis the media (e.g., the disk). Typically, a head-media separation distance between the slider and a spinning disk is 10 nm or less.

An ideal slider for use in a hard-disk drive would have flat and uniform surfaces, including the air bearing surface. However, a slider is generally not merely flat, but has a purposely-contoured air bearing surface in order to permit function of the air bearing, leading to a fly height, as discussed above. Flat surfaces would generally lead to more predictability and precision, especially on a very small, nanometer scale. In practice, however, sliders generally do not have desired, ideal, or uniform flatness (defined by flatness parameters), and may have surface feature imperfections for a variety of reasons. One way to increase performance and to reduce the head-media separation distance is to better flatten or reduce the roughness (and thus increasing the flatness) of certain of the slider surfaces, in particular an air bearing surface. The air bearing surface generally faces the media or disk over which the slider would eventually fly over during use. Better flattening and/or reduction in roughness of the slider surfaces may lead to more uniformly flattened or contoured slider surfaces, which may be desirable.

One method by which slider surfaces can be flattened and/or reduced in roughness is through lapping. Lapping, as used herein, is a machining process related to polishing by which two surfaces are rubbed together with an abrasive between them, whereby unwanted material is removed from an object, such as a slider, in order to give desired surface qualities, dimensions, and/or shape of the object, such as flatness. Lapping, also referred to as plate lapping, can operate on the nanometer scale, and can preferably have a high degree of precision for materials processing. Lapping, as used herein, may utilize a lapping plate, and both free abrasive lapping and fixed abrasive lapping are contemplated. A slider may have undesirable imperfections before lapping, but may also retain some degree of imperfection during, and after a lapping process.

Multiple sliders are often fabricated from a single wafer that is cut into slider bars. Slider bars may be held by bar carriers during lapping. The wafer may be formed of the materials and layers specified for a desired slider construction. The wafer may be composed of various materials, including ceramic materials and/or silicon. Examples include $Al_2O_3$, TiC, etc. From such a wafer, a portion of the wafer is separated from the remainder, the portion is typically rectangular and is dimensioned based upon a desired number of rows and number of sliders in each row. Known processes utilize a rectangular wafer portion that is appropriately sized to produce roughly 40 rows of sliders with each row providing about 60-75 sliders. The wafer portion is then diced into slider bars equal to the number of rows provided, creating an equal number of slider bars as there are initially rows.

After separation into the slider bars, it may be determined that a surface of at least one of the slider bars has imperfections. If at least some imperfections are found, such as surface roughness, the slider bars may benefit from flattening. The surface may then be lapped in order to increase surface flatness and to decrease surface roughness. An example slider bar may have dimensions of one slider length wide by 70 slider widths long. An example surface subject to a lapping step is a common air bearing surface of one or more slider bars. Following the lapping operation, slider bar carriers for flatness metrology can be configured to support each of the slider bars that have been separated from a wafer and to accurately hold each of the slider bars at a proper orientation to measure the lapped surface or air bearing surface. As above, a typical slider bar carrier may hold 40 slider bars each of a length of 70 sliders to make, for example, a total of 2,800 sliders. The air bearing surface of each slider is preferably lapped to comply with desired slider surface characteristics, such as slider curvature metrics (degree of flatness) in terms of crown, cross, and/or twist curvature. A slider bar carrier, as used herein, may be a free-bar carrier or a production bar carrier.

A typical slider is roughly rectangular when viewed from an air bearing surface of the slider, the slider having a length and a width. As used herein, three types of across-slider curvature metrics are defined, as follows. Crown curvature is the curvature of a slider following the length (longitudinal axis) of a slider. Cross, camber, or cross-crown curvature is the curvature of a slider following the width (transverse axis) of a slider, this direction can also be referred to as cross-track from a head perspective. Twist curvature is curvature where a slider has at least a degree of twist about its longitudinal or transverse axes, that is, where one end of a slider is not coplanar with another end of the same slider. While twist does not typically directly affect fly height, high twist curvature values, either positive or negative, can cause other negative tribological (i.e., interactive surfaces in relative motion) effects, such as increased wear due to changes in friction or lubrication, and/or induced roll.

After a lapping process or step is performed, individual sliders of the slider bars may be separated from one another, e.g., by dicing, for assembly and use in a hard-disk drive head suspension assembly. However, slider surface flatness may preferably be verified prior to dicing the sliders to be sure that the air bearing surface of each slider is flattened to a desirable specification for usage. If the slider surface flatness is determined to be suboptimal, a further lapping step could be performed prior to dicing the sliders from the slider bars. It may be undesirable or inefficient to perform a lapping step on each slider individually. Additionally, this slider flatness data could be used to set scrap limits to improve downstream performance.

Slider surfaces are typically inspected using optical metrology technology such as utilizing commercially-available interferometric systems. An interferometer is a known device that utilizes interferometry, where electromagnetic waves are superimposed in order to extract information about the waves. Interferometers are typically used to measure small displacements, refractive index changes, and surface irregularities. An interferometer may be used to measure surface irregularities of one or more sliders.

Various interferometer systems, such as small aperture interferometers, are commercially available from, for example, Bruker Corporation, Zygo, or Taylor-Hobson, specifically including a small aperture optical interferometers having approximately a 1-2 mm imaging area field-of-view (FOV) that is sized to image and model flatness of individual sliders. Small aperture interferometers would typically image an individual slider at a time while the sliders are still present in slider bar form.

Various slider fabrication process steps include a high level of complexity, low tolerances, and small size specifications. Typical process steps include sub-micron wavelength photolithography, reactive ion etching, ion milling, and/or thin film deposition. A lapping step, as stated, is often used to ensure that the surface roughness of the slider air bearing surface of is minimal. Materials used in the manufacturing of a slider vary depending on the desired properties. Typically, magnetic heads, which may include read/write elements, are constructed from a variety of materials, such as magnetic alloys, metal conductors, ceramic, and polymer insulators in a complex three-dimensional (3D) structure having precise tolerances.

This disclosure describes methods and structures for an improved manner of measuring surface flatness of a plurality of slider surfaces. The methods and structures use a large aperture interferometer to capture an image of a full slider bar carrier in one shot, e.g., a single imaging step, followed by segmenting the captured image having a surface height data map into individual slider height maps in order to assess flatness of the individual slider surfaces, which includes various slider curvature metrics such as crown, cross, and/or twist curvature. This disclosure further improves on previous methods and systems by using pattern recognition of slider poles (e.g., a combination of read and/or write elements of the slider) to more accurately crop out sliders of a bar image. This achieves a high accuracy in determining the slider surface features. According to preferable embodiments of the present disclosure a slider pole includes both a read element and a write element of a particular slider.

In addition to using a height-map image for measuring slider surface flatness, an intensity or modulation channel image (according to a respective intensity or modulation channel) is also used, at least in part because the slider poles can be more easily distinguished and discernible from the background in the various images being analyzed. The various channel images can be used for pattern recognition of the poles on the slider bar(s) with the actual slider potions on the bar. Then, the height map image of the slider bar can be divided or segmented into individual slider images for individual surface flatness measurements.

In an example image captured by a large-aperture interferometer, the pixel resolution may be limited. Therefore, a particular slider pole intensity or modulation channel image may only include a few pixels, the pixel brightness and count can vary from pole to pole. In some cases, slider pole may not be discernible from the slider image, e.g., due to contamination or chipping at the slider pole position. These factors have made it challenging to identify the sliders using slider pole on a slider-by-slider or pole-by-pole basis. In other embodiments, the slider pole intensity or modulation channel image may include more than a few pixels, and in this case a slider pole may include less than both a slider read element or write element, such as only a slider read element or only a slider write element.

As described herein, an entire series of poles on a slider bar can be detected instead of detecting slider poles one-by-one. According to one embodiment, a pole alignment mask can be created such that the mask is a line that has a length equal to the entire length of the slider bar, and having a total slider-to-slider pitch width of all the sliders on the bar. The pixels on the line corresponding to the pole positions can then be marked or highlighted. The standard slider-to-slider pitch and the pole position of the various sliders can be received or obtained from slider design or specification documents or files. Next, a cross-correlation between the pole alignment mask and the portion of the intensity or modulation channel (slider bar) image, which contains the poles, can be calculated over the range of the first few slider widths. The position of a first spike in the cross-correlation plot would correspond to the position where the pole alignment mask accurately aligns with the actual positions of the series of poles on the slider bar. Then, the positions of the poles in the pole alignment mask can be used to arcuately crop the individual sliders out of the height-map bar image for slider surface flatness analysis. According to the present disclosure, this can be achieved even if the corresponding actual poles are not discernible in the intensity or modulation channel image due to contamination or chipping on or near the pole positions.

In addition to the advantages of high-throughput and fully-automated analysis, the present disclosure further provides the advantage of low analysis error. This is due at least in part to pattern recognition of the entire series of poles on the bar ensuring that the bar image is accurately separated into individual slider images. For example, the methods of systems disclosed herein can also be employed to determine whether one or more slider bars are considered "upside down" during a slider production process. For example, if slider poles of at least one slider bar are not detected as described herein, this can indicate that the particular slider bar(s) are upside down. Making such a determination of slider bar orientation may have many benefits, such as reducing yield losses and making appropriate physical or electronic corrections during the production process prior to production, surface metrology, and/or dicing steps. According to Applicant's research and study, standard errors were reduced by 20% following the implementation of the pattern recognition of the slider poles for mask alignment of the present disclosure.

The described surface measurement methods and systems allow for quick measurement and characterization of many thousands of sliders in one large aperture interferometer capture shot with a FOV prior to separating the individual sliders, by dicing them from slider bars, for assembly in hard-disk drives. The proposed methods aid in providing desired flatness parameters for thousands of sliders in a reduced amount of time.

The present disclosure is based upon methodology including optical metrology. It is a purpose of the present disclosure to increase flatness sampling and measurement to 100% of the sliders within a reduced time period. The present disclosure may enable an economically-viable means of attaining 100% sampling of production flatness and allow for determining slider bar surface and profile information in terms of a slider height map.

Large aperture interferometers and hardware having sufficiently high pixel density allowing for bar identification and slider segmentation are commercially available. By utilizing pattern recognition image segmentation methods, individual slider surfaces are identified and converted into respective bar height maps. The time used to capture an image may be similar to the time presently used to capture an image of each individual slider. Processing time to conduct the slider bar identification and slider segmentation analysis would be greater in processing a bar or slider bar carrier, but compared with the imaging and analysis of individual sliders, the analysis of the present disclosure saves time.

Disclosed methods and systems may be around 50 times faster than the existing methods and systems for individual slider surface height measurement. With the addition of using pattern recognition of the slider poles, sliders or slider images can be cropped out of a bar image more accurately and more efficiently than at present.

FIG. 1A-1D illustrate an example conventional slider bar measurement method.

FIG. 1A shows a first step of a conventional method for sequentially measuring multiple sliders included in a slider bar 110.

An existing process begins with a wafer (not shown) that will eventually become a plurality of sliders. A wafer is first separated into one or more slider bars 110. The wafer and/or slider bar 110 can be optionally lapped at various times. The slider bar 110 is composed of a plurality of connected (e.g., unseparated or non-diced) sliders and components thereof. A slider bar 110 typically includes about 60-75 connected sliders. As stated, the slider bar 110 and sliders thereon may have been lapped prior to this step. Slider bar 110 may have dimensions equivalent to a height of a slider, by a width of multiple sliders, forming a roughly one-dimensional slider bar 110. A highlighted slider section 111 is centered on several non-diced sliders on the slider bar 110, and will be described in greater detail, with reference to FIG. 1B.

FIG. 1B shows an enlarged view of slider section 111 of the slider bar 110 of FIG. 1A in greater detail.

Individual slider features 114 can be seen in slider section 111 of slider bar 110, including electrical contacts along with read/write elements even as the sliders are not yet diced from one another. An imaging area 112 shows an approximate location of a non-diced slider on slider bar 110. Imaging area 112 indicates a typical field-of-view (FOV) or imaging area for an example existing imaging device configured to analyze imaging area 112. Imaging area 112 and imaging device, e.g., a small aperture interferometer having an FOV of roughly 1-2 mm, typically has a FOV sufficient to analyze one typical slider. The imaging area 112 generally corresponds to an air bearing surface area of one of the sliders of the slider bar 110. Corresponding lateral resolution and pixel size of the small aperture interferometer imaging device used to analyze a slider within imaging area 112 is typically in the range of 2-3 µm.

FIG. 1C illustrates an imaging device objective 116 located above a single slider 118 within imaging area 112.

An objective 116 of an example imaging device (e.g., a small aperture interferometer) may have an imaging area FOV of imaging area 112 of a single slider 118 on the slider bar 110, with the objective 116 located above and configured to look down upon and image the slider 118. The objective 116 of the imaging device is shown positioned to capture an area measurement zone of the slider 118, for analysis. Using the objective 116, the imaging device may measure and analyze the surface flatness of the slider 118, including area, topography, and/or other characteristics of slider 118, e.g., using surface metrology. The imaging device forms an electronic image or map of a surface metrology of the slider 118, which includes topographical and surface characteristic data of the slider 118.

FIG. 1D is a three-dimensional graphical representation of measured flatness parameters of a slider after the surface of the slider has been measured.

After the electronic image of the slider 118 is captured, as shown in FIG. 1C, the surface flatness is analyzed using various applicable methods. Using a commercially-available imaging device (e.g., small aperture interferometer), each slider, (including slider 118) is measured in turn across the slider bar 110 and modeled for slider flatness parameters of interest, as a function of three axial dimensions, x, y, and z, F(x,y,z). Sliders are measured sequentially across the slider bar 110 for each of the (roughly 70) sliders. Each slider measurement presently takes several (e.g., five) seconds. To measure a full slider bar 110 thus generally takes several minutes. Only one slider 118 at a single location (imaging area 112) at a time is measured on the slider bar 110 using the shown method.

The analysis of the surface flatness of the slider 118 preferably provides a height map image 120 (e.g., surface map) that indicates flatness parameters 122, as a function of x, y, and z dimensions, F(x,y,z). The height map image 120 is shown as a three-dimensional computer-generated image, having colors or grayscale shading indicating surface height data (y-axis data) over a plane formed by an x-axis and a z-axis. The x, y, and z dimension data may then be modeled or fit to various slider curvature metrics (degrees of flatness), e.g., crown, cross, and/or twist curvature.

If any of the one or more sliders (e.g., slider 118) is not sufficiently flat in the y-axis dimension in terms of the x, and z dimensions, the slider bar 110 could be lapped again before dicing, or the slider 118 or slider bar 110 could be rejected.

As stated, using current systems and techniques described above, imaging and analysis of a single slider (e.g., slider 118) takes about five seconds per measurement. Thus, to measure flatness of each slider of a slider bar 110 takes approximately six minutes (five seconds multiplied by 70 sliders on a slider bar 110). As outlined in the background, above, a typical slider bar carrier supports 40 slider bars (e.g., slider bar 110). Even assuming an ideal 100% sampling efficiency (e.g., no errors or problems interpreting surface flatness or metrology data), it would then take approximately four hours to take flatness measurements for each slider of one 40 slider bar carrier (six minutes times 40 slider bars 110 equals approximately four hours).

A large number of complex systems are generally employed if full (100%) sampling is utilized for slider production. Such systems not only expend capital, but also large amounts of floor space, along with related maintenance and engineering support. Such systems also may need tool-matching procedures and calibrations to reduce yield errors from matching offsets. If only limited sampling is conducted in order to save of equipment and space, overall slider bar 110 profile information generally cannot be gathered, and the manufacturing line is at a higher risk of flatness excursions or imperfections.

In more detail, FIGS. 2A-2D illustrate steps in an improved method by which a plurality of sliders can be analyzed for flatness simultaneously, according to various embodiments.

Figure 2D:
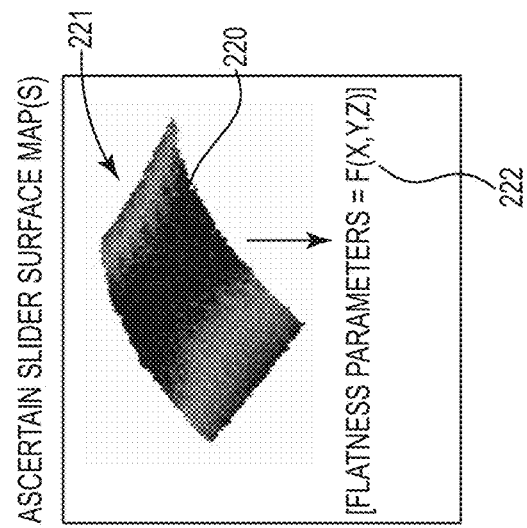
FIG. 2D illustrates a three-dimensional individual slider surface map of a single slider following segmentation from slider bar map using the cropping mask, according to various embodiments.
Figure 2A:
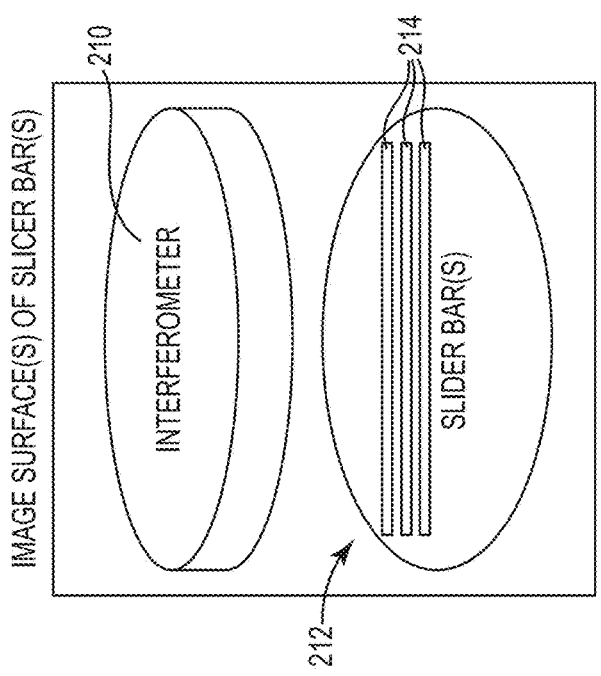
FIG. 2A shows an arrangement where a large aperture interferometer is located above one or more slider bars, according to various embodiments.

FIG. 2A shows an arrangement where a large aperture interferometer 210 is located above one or more slider bars 214, according to various embodiments.

Existing surface metrology systems in use for sliders (e.g., FIGS. 1A-1D) can take many hours to measure a single slider bar carrier full of slider bars. In contrast to FIGS. 1A-1D, where each slider needs an individual time-consuming measurement, FIG. 2A shows a first step in process where multiple sliders can be measured for surface flatness and surface height data at the same time using a large aperture interferometer 210 capable of capturing an entire slider bar carrier (not shown, see 1010 of FIGS. 10 and 11) of non-diced sliders in sufficient detail to allow for segmentation of captured interferometric data into three-dimensional individual slider height maps derived from the surface height data. In addition, a cropping mask 216 can be aligned and adjusted with the assistance of slider components in order to get a more accurate surface assessment of each individual slider 220 of one or more slider bars 214. The present disclosure can operate to reduce the occurrence of false positives and false negatives in slider assessment by more accurately aligning cropping masks 216 with actual slider 220 positions on a slider bar 214 using techniques such as pattern recognition. A false positive can include a slider where the flatness appears within a desired product specification, but in reality fails to meet the specification, thus introducing risks to the performance of an assembled drive. A false negative can include a slider that appears to fail to meet a desired specification, but in reality would meet such a specification, leading to reduced slider yields and increasing manufacturing costs.

Interferometers, as used herein, may come in small aperture type or large aperture type. A small aperture type interferometer has a FOV imaging area 112 of about 1-2 mm. A large aperture type interferometer, in contrast, has a FOV imaging area 212 of about 50-80 mm, which is enough FOV to observe an entire slider bar carrier or wafer for the production of one or more sliders. An example large aperture interferometer 210 is the AccuFiz® interferometer, which is commercially available from the 4D Technology Corporation of Tucson, Ariz.

Still with reference to FIG. 2A, a large aperture interferometer 210 (in contrast to the small aperture interferometer and objective 116 discussed with respect to FIGS. 1A-1D) can be configured to capture a FOV having a circular, ellipsoid, or other shaped imaging area 212, as illustrated, that is large enough to capture the length of at least one slider bar 214 (having approximately 70 sliders from end to end). An imaging area 212 of the large aperture interferometer 210 may also be large enough to capture multiple bar widths simultaneously. Preferably, the imaging area 212 of the large interferometer 210 is large enough to capture a single, high-resolution, and high-precision interferometric image of an entire slider bar carrier (not shown, see 1010 of FIGS. 10 and 11) supporting, for example, 40 slider bars (including slider bar(s) 214).

Preferably, the large aperture interferometer 210 has a FOV with an imaging area 212 of about 80 mm at high resolution, allowing capture of an entire slider bar carrier, as presently contemplated. As an example, with 70 sliders per slider bar 214 and 40 slider bars 214 per slider bar carrier, the large interferometer 210 can measure 2800 sliders at the same time by capturing a sufficiently high-resolution image of the entire slider bar carrier within imaging area 212. A high-precision interferometer (e.g., interferometer 210) having a pixel density of less than 25 µm per pixel, may be preferably employed in order to obtain a desired resolution and/or precision for the purposes of this disclosure. The imaging area 212 may be circular, but may be shown in a slanted perspective. A slider bar 214 may also be a slider lapping bar, according to various embodiments.

The large aperture interferometer 210 may preferably have a sensor or imaging device, such as a camera or objective that is capable of capturing a sufficiently high-resolution image, as an aspect of this disclosure. Furthermore, the large aperture interferometer 210 can detect image characteristics according to multiple data channels, such as height, intensity, and modulation, among others. High-resolution, for the purposes of this disclosure, may be defined as a characteristic of a sensor device capable of detecting six million discrete pixels or more, according to various embodiments. However, the resolution should preferably be high enough to allow for sufficient data to be obtained for each individual slider surface, irrespective of a total number of pixels. Equipped with a high-resolution sensor device, a large-aperture interferometer (e.g., 210) can capture an image of a fully-loaded slider bar carrier, as would advance from a lapping apparatus. Preferably, a minimum of about 20 pixels of image data may ideally be obtained in the x and y directions to develop a digitized slider height map in terms of the x and y directions, as discussed further, below. More preferably, a resolution allowing for 40 or more pixels in the width (transverse) direction as shown in FIG. 2D can be obtained along with 100 or more pixels in the length (longitudinal) direction of a slider 220 (see FIG. 2C, 2D). As above, with a sufficient resolution and thus sufficient data points per slider, slider curvature metrics (e.g., degrees of flatness) including crown, cross, and/or twist curvature can be modeled and determined through various techniques and methods. With a high-resolution interferometer, such as large aperture interferometer 210, an increased resolution may permit reduced sensitivity to vibrations and other factors that affect precision and accuracy.

An example operation and methodology for determining individual slider 220 surface flatness may begin by placing a slider bar carrier within a FOV imaging area 212 of a large aperture interferometer 210, according to various embodiments. A high-resolution interferometric image according to multiple data channels may then be captured using the large interferometer 210, preferably of the entire imaging area 212, including many or all of the slider bars (e.g., slider bar 214) of the slider bar carrier in various known arrangements. As shown, the large aperture interferometer 210 is positioned to look down at slider components being analyzed, including one or more representative slider bar(s) 214 (which may not be drawn to scale). In practice there could be many (e.g., 40) slider bars 214 measured in one capture shot. As a result, thousands of sliders (e.g., slider 220) may be measured or imaged by the large interferometer 210 and a system or controller connected thereto at one time. Preferably, all of the slider bars 214 would be captured by the large interferometer 210 imaging area 212 in one capture shot, leading to increased efficiency in surface metrology.

Figure 2B:
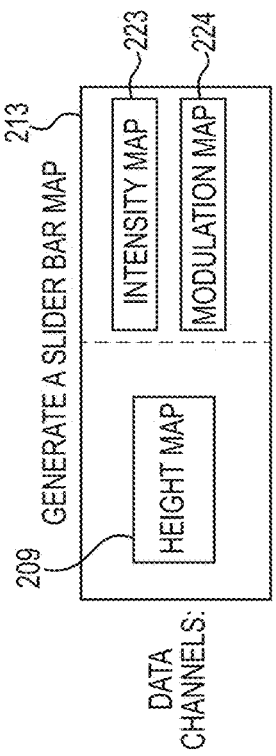
FIG. 2B shows various data channels that can be generated by the large aperture interferometer as it is used to image the at least one slider bar according to FIG. 2A.

FIG. 2B shows various data channels that can be generated by the large aperture interferometer 210 as it is used to image the at least one slider bar 214 according to FIG. 2A. FIG. 2B can illustrate a slider bar map generation step with respect to multipole data channels of slider data, according to various embodiments.

An image, e.g., a slider bar map 213, can be created by the large aperture interferometer 210. The slider bar map 213 can include more than one data channel, and corresponding images according to the more than one data channel. For example, the slider bar map 213 can include a height map 209. The height map 209 can include topographical information of one or more sliders of the slider bar(s) 214 imaged by the large aperture interferometer at FIG. 2A. In addition to the height map 209, the slider bar map 213 can also include one or more other data channels, such as an intensity map 223 and/or a modulation map 224. As will be described herein in greater detail, the inclusion of either the intensity map 223 or the modulation map 224 within the slider bar map 213 can facilitate slider pole identification and location determination, which can be used in a cropping mask 216 alignment prior to determining slider 220 flatness parameters and/or slider dicing. The intensity map 223 and the modulation map 224 can correspond to an intensity or modulation image using according to a respective intensity or modulation channel, as used herein.

According to FIG. 2C, the slider bar map 213 can be used to align a cropping mask 216 relative to a single slider bar 214. The slider bar 214, as shown, has been digitally segmented into a plurality of individual slider surface maps 221 of equally-sized sliders 220. Using the slider bar map 213 of FIG. 2B can permit adjustment and alignment of the cropping mask 216.

Pattern-recognition techniques may be used to identify and analyze the slider bar 214 within the imaging area 212. A bar profile including a (digitized) slider bar map 213 according to various data channels for each slider bar 214 may then be preferably created using an applicable calculation method based on the high-resolution interferometric image captured in FIG. 2A. The height map 209 of the slider bar map 213 may contain surface height data in three-dimensions, including x-, y- and z-axis data and/or dimensions of the bar 214. One (or more) full, common slider bar 214 surface is represented within the map as opposed to a single slider surface (in contrast to FIGS. 1A-1D). The slider bar map 213 may advantageously represent relevant bar interferometric profile information for a plurality of individual sliders, including variations in height, curvature, flatness, imperfections, and other variations.

The slider bar map 213 may represent the relevant bar interferometric profile information through the use of visuals, such as color gradient, grayscale, or alternatively, a computer-readable digital format. According to one embodiment, a color gradient is used to represent variations in height of the slider bar map 213, and a user may view the color to quickly assess the relative topography of a slider bar 214. If a color gradient is used, lower wavelength color, such as violet, may represent a higher point (relative height), and a lower wavelength color, such as red, may represent a lower point of a surface of a slider or slider bar 214. If a grayscale is used, a lighter color may represent a lower point, and a darker color may represent a higher point, according to one embodiment.

The slider bar map 213 can represent one or more individual slider surface maps 221 (one of which is shown in FIG. 2D). The slider bar map 213 with regard to each individual slider surface maps 221 contained thereon may have respective individual slider data, color, and/or curvature. A shown with respect to FIG. 2C, the cropping mask 216 can be aligned according to a plurality of n sliders from slider 1 at a first end 215 to slider n at a second end 217. The cropping mask 216 to be aligned with the slider bar 214 can also have a middle point 218. Each of the first end 215, second end 217, and middle point 218 may represent one or more individual slider surface maps 221 or slider data, as discussed herein. The first end 215 may represent a first slider, and the second end 217 may represent a last or $n^{th}$ slider 220. One goal of the present disclosure is to improve alignment of the alignment mask with the individual sliders for use in cropping/dicing of individual sliders.

In particular, a cropping mask 216 may benefit from translation, resizing, reshaping, or other adjustment when individual sliders and slider features are observed. The cropping mask 216 may then be aligned with individual sliders 220 having individual slider surfaces (see FIG. 2D) according to the slider bar map 213. Following the creation of a slider bar map 213 and the alignment of the cropping mask 216 based on the slider bar map, a method may segment the multiple-slider slider bar map 213 into individual slider surface maps 221 (see FIG. 2D), with each individual slider surface maps 221 including slider 220 data in three-dimensions, including x-, y- and z-axis data and/or dimensions. The segmentation of the method may begin with a slider 220 at the first end 215, and may continue segmenting sliders 220 at the middle point 218, and may continue segmenting until an $n^{th}$ slider is segmented on the second end 217. A dicing process can also separate the sliders 220 from the slider bar 214.

Various pattern recognition techniques or methods may be employed to identify individual sliders 220 from one another, within the slider bar map 213. An example method may utilize pattern recognition based on visible or identifiable slider components and/or characteristics (e.g., magnetic read/write head components, exposed bonding pads, electronic lapping guides, surface features, etc.). Such identifiable slider components and/or characteristics can be referred to herein as slider "poles." Slider poles can be preferably detected using two or more data channels within the slider bar map 213. Alternatively, a different method may simply identify or receive total dimensions of the bar 214 and the number and/or width of sliders 220 contained within, and divide or segment the slider bar map 213 into the applicable number of individual slider surface maps 221, based upon the total number of sliders 220, defining the location and dimensions of each slider 220 within slider bar map 213. Pattern recognition techniques and methods, as contemplated, may also employ heuristic or learning approaches, in order to increase efficiency and accuracy of identification of various sliders 220 from one another, according to various embodiments.

FIG. 2D illustrates a three-dimensional individual slider surface map 221 of a single slider 220 following segmentation from slider bar map 213 using the cropping mask 216.

A individual slider surface map 221 corresponding to an individual slider 220 may be produced according to data channels of the slider bar map 213, and may be modeled and defined in terms of flatness parameters F(x,y,z) 222. According to other embodiments, multiple individual slider surface maps 221 may be produced from multiple respective individual sliders 220. Various desired or ideal slider flatness parameters may be received and may also be represented as a function in terms of dimensions in the x-, y-, and z-axis, F'(x,y,z). A method may then compare and contrast functions F(x,y,z) and F'(x,y,z) in order to determine if a lapping or subsequent lapping step is desired. Whether a lapping step is desired may be determined based on a flatness threshold, and whether the flatness threshold is met before or after a lapping step. A flatness threshold may be set at a level of total permissible imperfections on an individual slider surface map 221, or a slider bar map 213, according to various embodiments.

Following division of the (digitized) slider bar map 213 into individual sliders 220, an individual slider surface map 221 is then preferably created for each individual slider 220. This individual slider surface map 221 is preferably similar to that discussed above and shown in FIG. 1D, as such individual slider surface map 221 was created for a slider 220 surface from an individual slider image surface capture. The resulting individual slider surface maps 221 can then each be assessed for surface characteristics, e.g., characteristics indicative of the production quality of the individual corresponding slider 220.

Image 300, according to FIG. 3, represents a plurality of slider bars 214 as viewed according to a surface data channel only. When only observed according to this one data channel, it can be seen that the slider bars 214 have a certain length, and it could be estimated what size and shape each slider within the slider bars 214 would take, including relative spacing. However, as no visual indicators are shown to give a point of reference, it is possible that a cropping mask 216 could be applied to the slider bars 214, as shown, and have inaccuracies in terms of slider spacing and cropping mask 216 placement.

In contrast, image 400, according to FIG. 4 shows a plurality of slider poles 410, revealed on each slider bar 214. As described herein, slider poles 410 can represent slider read/write elements, which can be detected according to images taken with the large aperture interferometer according to more than one data channel. The poles 410 can then be used to assist in the positioning and/or adjustment of the cropping mask 216, as described above.

Slider pole 410 position can be defined during wafer lithography steps can have less than one micron of alignment error relative to a slider body. Furthermore, the pole 410 position can also be used for dicing sliders from one another in downstream slider dicing processes, which can define the final slider body. For at least these reasons, using the pole 410 position to determine slide image cropping is well-matched to an actual slider definition process.

Figure 5:
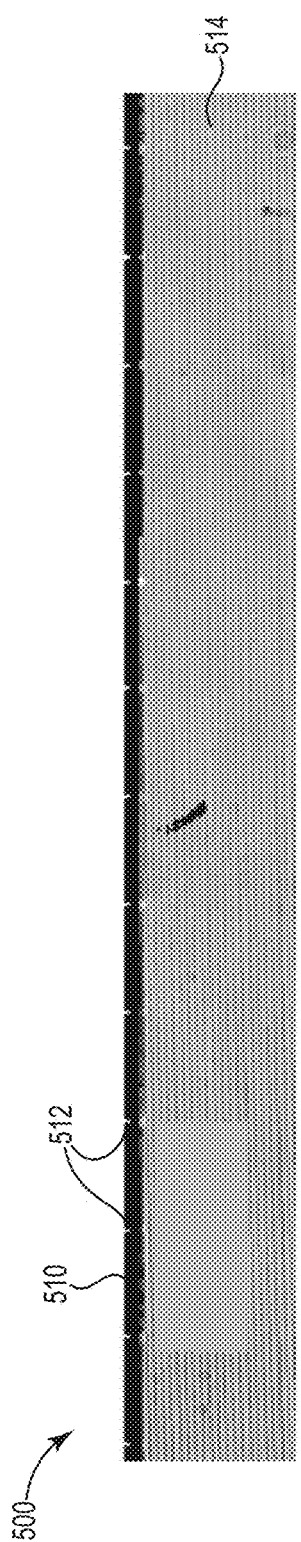
FIG. 5 is a side view of a slider bar after positioning of a cropping mask having cropping mask features that are preferably aligned with the slider poles.

FIG. 5 is a side view 500 of a slider bar 514 after positioning of a cropping mask 510 having cropping mask features 512 that are preferably aligned with the slider poles 410. Cropping mask 510 can be similar to cropping mask 216, according to various embodiments.

Figure 6:
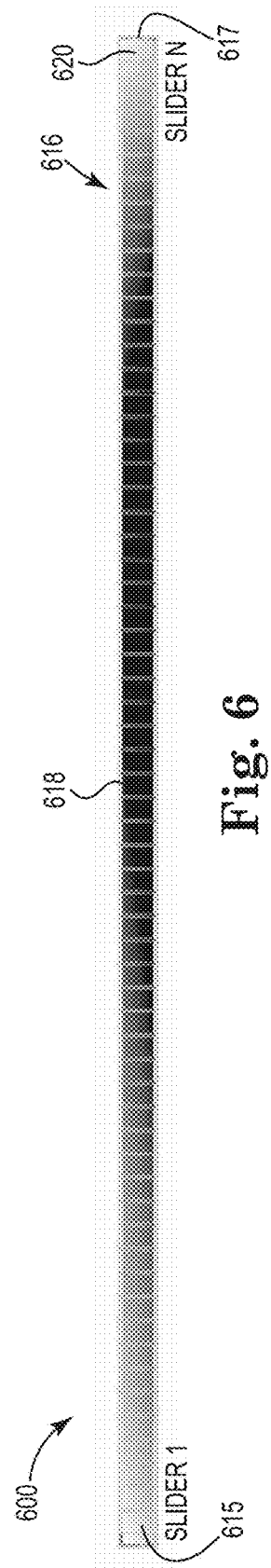
FIG. 6 shows a cropping mask that is positioned relative to the slider, with accurate placement at a slider bar first end at slider 1, at a slider bar second end at slider n, according to various embodiments.

FIG. 6 shows a cropping mask 616 that is positioned relative to the slider 620, with accurate placement at a slider bar first end 615 at slider 1, at a slider bar second end 617 at slider n. In particular, the cropping mask 616 can be adjusted at a slider bar middle point 618, which may be subject to increased skew (i.e., distortion from a desired shape or geometry) or other inaccuracies without cropping mask alignment according to the present disclosure. Cropping mask 616 can be similar to cropping mask 216 or 510, according to various embodiments.

Figure 7A:
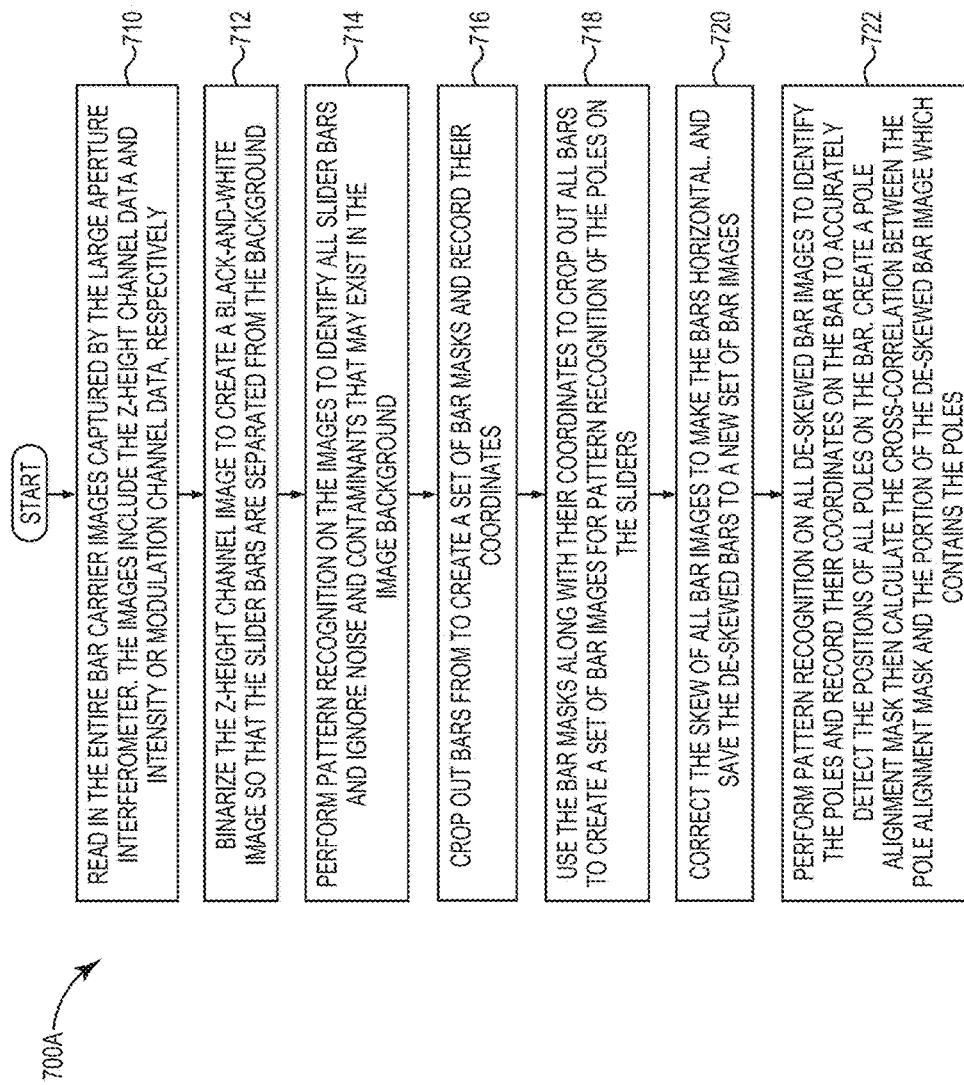
FIGS. 7A-7B together are a flowchart for a process, according to various embodiments.
Figure 7B:
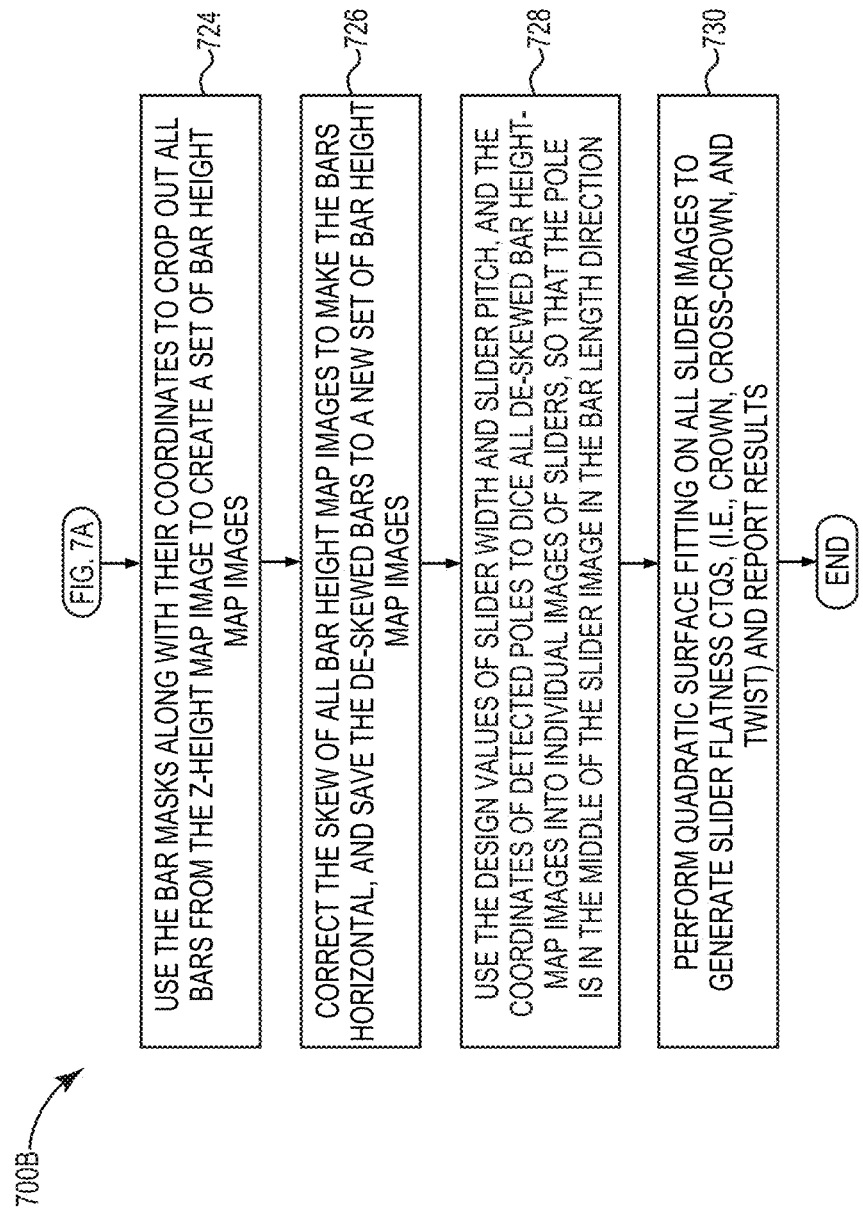

FIGS. 7A-7B together are a flowchart for a process 700, composed of operations 710-722 at 700A of FIG. 7A, and continuing to operations 724-730 at 700B of FIG. 7B. FIGS. 7A-7B can represent steps performed using a 3K-BigShot© analysis process, which can represent a fully-automated process that can process and analyze full carrier images captured by a large-aperture interferometer in order to determine surface features of all sliders of the slider bar on the carrier.

The process 700 can begin at operation 710, where one or more images of an entire bar carrier is captured by a large aperture interferometer, as described herein. The images can include the Z-height channel data and image,(imgZHeight), and intensity or modulation channel data (e.g., modulation image), (imgInten or imgMod, respectively) at operation 710, the intensity or modulation channel data (imgInten or imgMod) can be renamed to imgPattern. ImgPattern can then be used for pattern recognition of slider poles (read and write elements), as described herein.

At operation 712, the Z-height channel image (imgZHeight) can be binarized to create a black-and-white image (imgBW), so that the slider bars can be more easily separated and distinguished from a background.

At operation 714, a pattern recognition operation can be performed on the black-and-white image {imgBW} or the the Z-height channel data {imgZHeight} to identify all slider bars and preferably ignore noises and contaminants that may exist in the image background.

At operation 716, slider bars from the black-and-white image {imgBW} or Z-height channel data (imgZHeight) can be cropped out to create a set of bar masks,{barMask$_i$}, and record their coordinates in the black-and-white image {imgBW} or Z-height channel data {imgZHeight}, as {coordBarMask$_i$}.

At operation 718, the bar masks, {barMask$_i$}, can be used along with their coordinates {coordBarMask$_i$} to crop out all bars from the renamed imgPattern, to create a set of bar images, {barImgPattern$_i$}, for pattern recognition of the poles on the respective sliders. The (renamed) intensity image or modulation channel data or image instead of the Z-height map image can be used for pattern recognition at least in part because the poles appear more prominent in those images.

At operation 720, a skew of any or all bar images can be corrected or adjusted (i.e., de-skewed) in the set of bar images {barImgPattern$_i$} to make the bars horizontal, and save the de-skewed bars to a new set of bar images, {barImgPatDeskewed$_i$}.

At operation 722, a pattern recognition operation can be performed on all de-skewed bar images in the new set of bar images, {barImgPatDeskewed$_i$}, to identify the poles and record their coordinates on the bar, {coordPolesOnBar$_i$}. A preferable method to accurately detect the positions of all poles on the bar can include: creating a pole alignment mask as described herein, and then calculating a cross-correlation between the pole alignment mask and the portion of the de-skewed bar image which contains the poles. The position of a first spike in the cross-correlation plot would preferably correspond to the position where the pole alignment mask accurately aligns with the actual positions of the series of poles on the bar.

At operation 724, the bar masks, $\{barMask_i\}$, can be used along with their coordinates $\{coordBarMask_i\}$ to crop out all bars from the Z-height map image, $\{imgZHeight\}$, to create a set of bar height map images, $\{barImgZHeight_i\}$.

At operation 726, a skew of any or all bar height map images can be corrected in the set of bar height map images $\{barImgZHeight_i\}$ to make the bars horizontal, and save the de-skewed bars to a new set of bar height map images, $\{barImgZHeightDeskewed_i\}$.

At operation 728, the design values of slider width and slider pitch can be used, along with the coordinates of detected poles, $\{coordPolesOnBar_i\}$, to dice all de-skewed bar height-map images in the new set of bar height map images $\{barImgZHeightDeskewed_i\}$ into individual images of sliders, $\{sliderImgZHeight_{i,j}\}$, so that the pole is in the middle of the slider image in the bar length direction.

At operation 730, a quadratic surface fitting can be performed on all slider images, $\{sliderImgZHeight_{i,j}\}$, to generate slider flatness CTQs, (which can include crown, cross-crown, twist, etc.) and the results can be reported and/or transmitted.

Figure 8:
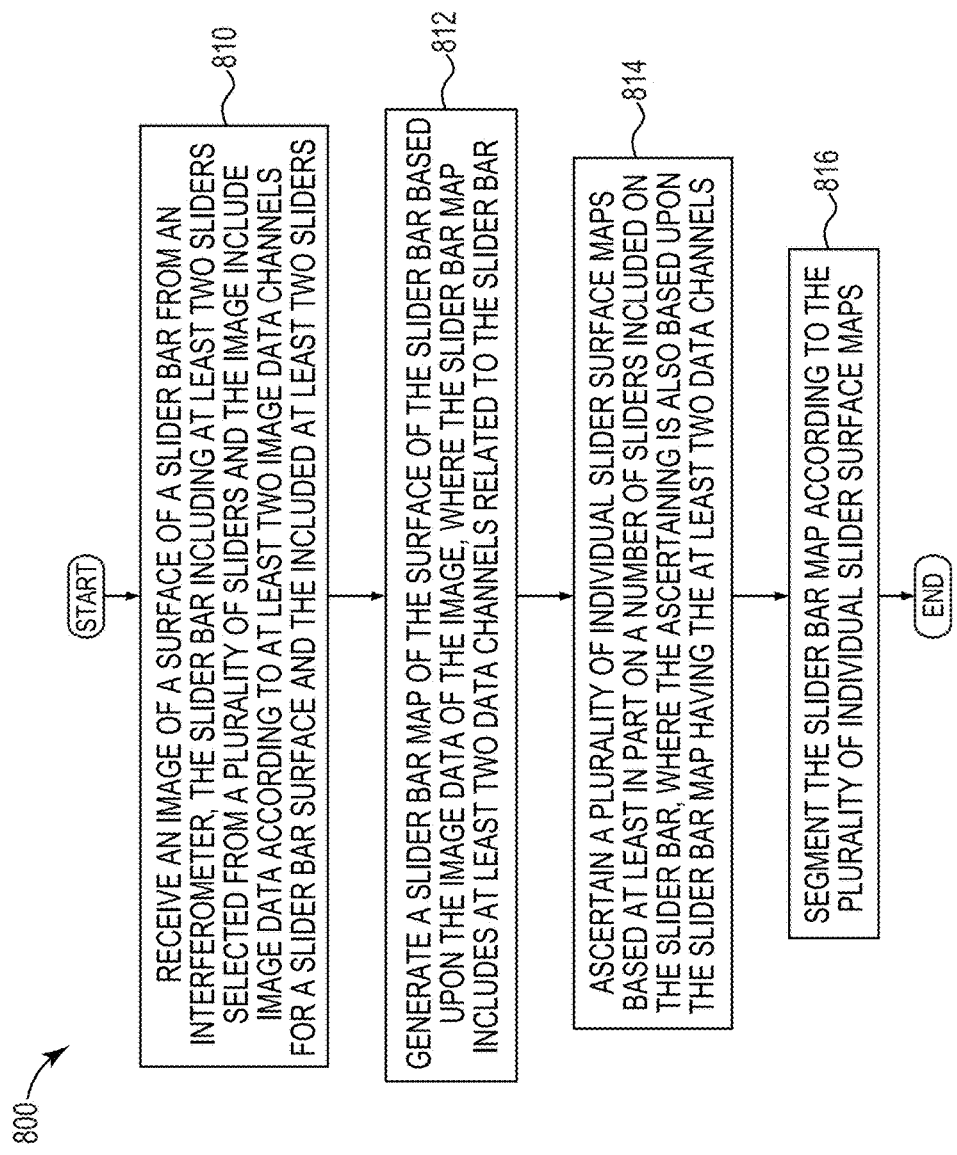
FIG. 8 is a flowchart of another process, according to various embodiments.

FIG. 8 is a flowchart of a process 800, according to the present disclosure. According to various embodiments, the method can be performed by an apparatus or system that includes a processor operatively coupled to a memory and a large-aperture interferometer. The apparatus can also include a slider cropping mask configured to be positioned proximate to a slider bar. The apparatus can also include a controller. The controller can be configured to perform a plurality of operations according to various embodiments.

According to the process 800, at operation 810 the process 800 can start by receiving an image of a surface of the slider bar from the interferometer. The slider bar can include at least two sliders selected from a plurality of sliders, and the image can include image data according to at least two image data channels for a slider bar surface and the included at least two sliders. In some embodiments, the plurality of sliders can include sliders from more than one single slider bar. In a case where more than one slider bar is being imaged by the interferometer, a wafer can include the more than one slider bars. In this way, in some embodiments, an entire or partial wafer can also be imaged in various embodiments. According to various embodiments, a first slider is positioned proximate to a first slider pole and a second slider is positioned proximate to a second slider pole. According to various embodiments, the first slider pole and the second slider pole each include a read element and a write element of a respective slider.

At operation 810, according to the process 800, a slider bar map of surface of the slider bar can be generated based upon the image data of the image. According to various embodiments, the slider bar map includes at least two data channels related to the slider bar. According to various embodiments, the at least two data channels includes a first surface height channel, and either a second surface intensity or a modulation channel. According to other embodiments, the slider bar map includes data related to the slider bar according to at least three data channels. In an example where the slider bar map includes data related to the slider bar according to the at least three data channels, the ascertaining the plurality of individual slider surface maps is based upon the slider bar map having the at least three data channels. In some embodiments, the at least three data channels include a first surface height channel, a second surface intensity channel, and a third surface modulation channel.

At operation 814, a plurality of individual slider surface maps can be ascertained based at least in part of a number of sliders included on the slider bar. The ascertaining at operation 814 can also be based upon the slider bar map having the at least two data channels. According to various embodiments, at least one of a position or a size and shape of the cropping mask is adjusted based on at least a location of the first slider pole and a location of the second slider pole. In some embodiments, the adjusting uses pattern recognition to identify the location of the first slider pole and the location of the second slider pole, and wherein the adjusting is also based on the slider bar map. Following operation 814, the slider bar map can be segmented at operation 816 according to the plurality of individual slider surface maps. The slider bar can then be diced into individual sliders based on the segmented bar map created at operation 816.

Figure 9:
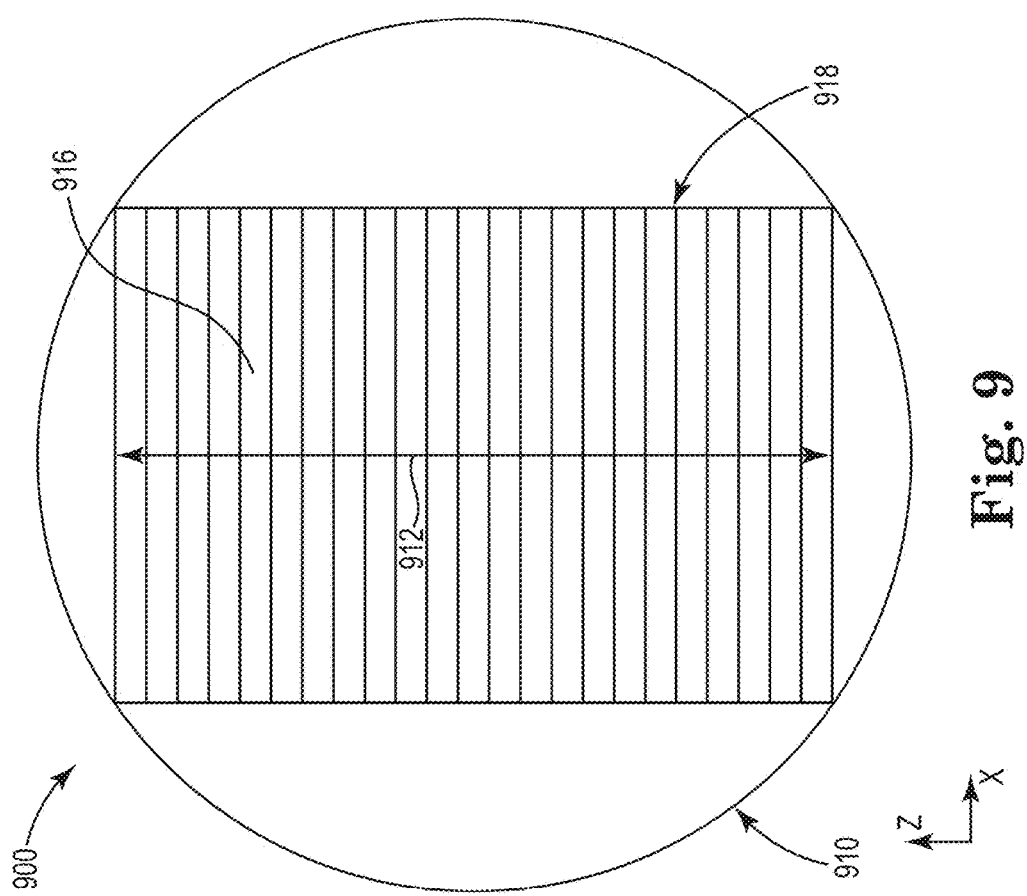
FIG. 9 schematically illustrates a field-of-view of a plurality of slider bars that are positioned in an imaging area of a large aperture interferometer of the present disclosure.

FIG. 9 schematically illustrates a field-of-view (FOV) 900 of a plurality of slider bars 916 that are positioned in an imaging area 910 of a large aperture interferometer of the present disclosure.

A FOV 900 of an imaging area 910 of an example large aperture interferometer (e.g., interferometer 210 of FIG. 2A) is shown positioned over a plurality of slider bars 916 (which may be held or supported by a slider bar carrier, according to various embodiments). The plurality slider bars 316 are oriented horizontally across the FOV 900, as shown. The slider bars 916 may not reach the edges of the imaging area 910, as the slider bars 916 are stacked vertically along vertical (z-) axis 912, forming a rectangular grouping 918 of slider bars 916. Alternatively, the imaging area 910 may be positioned over the rectangular grouping 918 of slider bars 916, such as may be supported by a slider bar carrier (e.g., slider bar carrier 1010 of FIGS. 10 and 11). The rectangular grouping 918 may be supported by a partially or fully-loaded slider bar carrier. The slider bars 916 are shown as vertically separated along vertical axis 912 of the imaging area 910, and the slider bars 916 are show aligned vertically along slider bar vertical axis 912.

The slider bars 916 may each include surface or visual markings or other height map representation (which may be similar to bar height map 213 of FIG. 2). The various height maps may be represented as a color gradient, grayscale, or a computer-readable format. Across slider bar 916, a bar height map (e.g., 213 of FIG. 2C) may be generated with colors indicating surface height data (y-axis data) in terms of a plane (formed by the x- and z-axis) of each slider bar 916. In the case of a color gradient example, a lower wavelength color, such as violet, may represent a higher point, and a lower wavelength color, such as red, may represent a lower point of a surface of a slider or slider bar 916. Alternatively, a grayscale or computer-readable format may be utilized, as described herein.

Specifically, the bar height map 213 of FIG. 2C may represent a captured interferometric flatness image of the wafer 212 (within a loaded slider bar carrier) with flatness or y-axis surface height data. According to an image map of the rectangular grouping 918 of the slider bars 916, the slider bar 916 rows are identifiable along vertical axis 912 of the FOV 900. Slider bars 916 can vary in height relative to one another for various reasons beyond the scope of this disclosure. A height map covering the entire surface of the rectangular grouping 918 may be electronically segmented into slider bar 916 "ribbons" with height maps that corresponding to the flatness of each slider bar 916. Each ribbon may correspond to a height map 213 shown in FIG. 2C. As discussed herein, by segmenting the surface height data of the entire FOV 900 and imaging area 910, individual slider bar height maps (e.g., bar height maps 213) can be obtained that contain flatness height maps for each and every individual slider.

Figure 10:
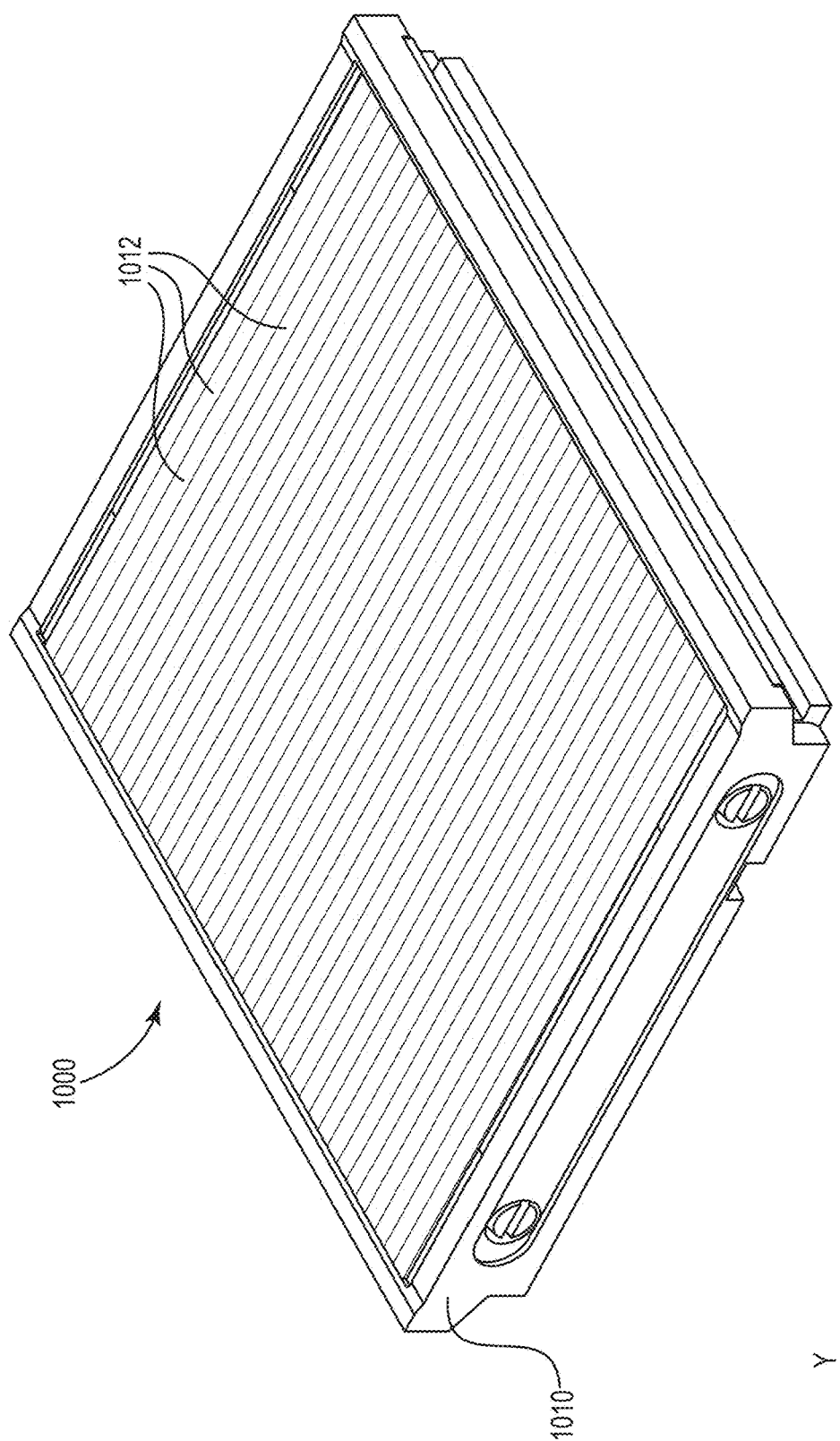
FIG. 10 is a perspective view of an example slider bar carrier having a plurality of slider bars thereon, according to various embodiments.

FIG. 10 is a perspective view 1000 of an example slider bar carrier 1010 having a plurality of slider bars 1012 thereon, according to various embodiments.

Following removal of slider bars 1012 from a slider wafer (not shown), the slider bars 1012 can be received by a slider bar carrier 1010. The slider bar carrier 1010 is shown fully loaded with slider bars 1012, with each of the individual slider bars 1012 supported for a lapping operation to occur on a common surface (e.g., an eventual air bearing surface, shown facing up) of each slider bar 1012. The common surface is the visible surface of the slider bar carrier 1010 from the shown perspective view 1000. A fully loaded slider bar carrier 1010 may hold about 40 slider bars 1012 arranged adjacent to one another (as shown, along the x-axis). The slider bar carrier 1010 may also be partially loaded, according to other embodiments.

Figure 11:
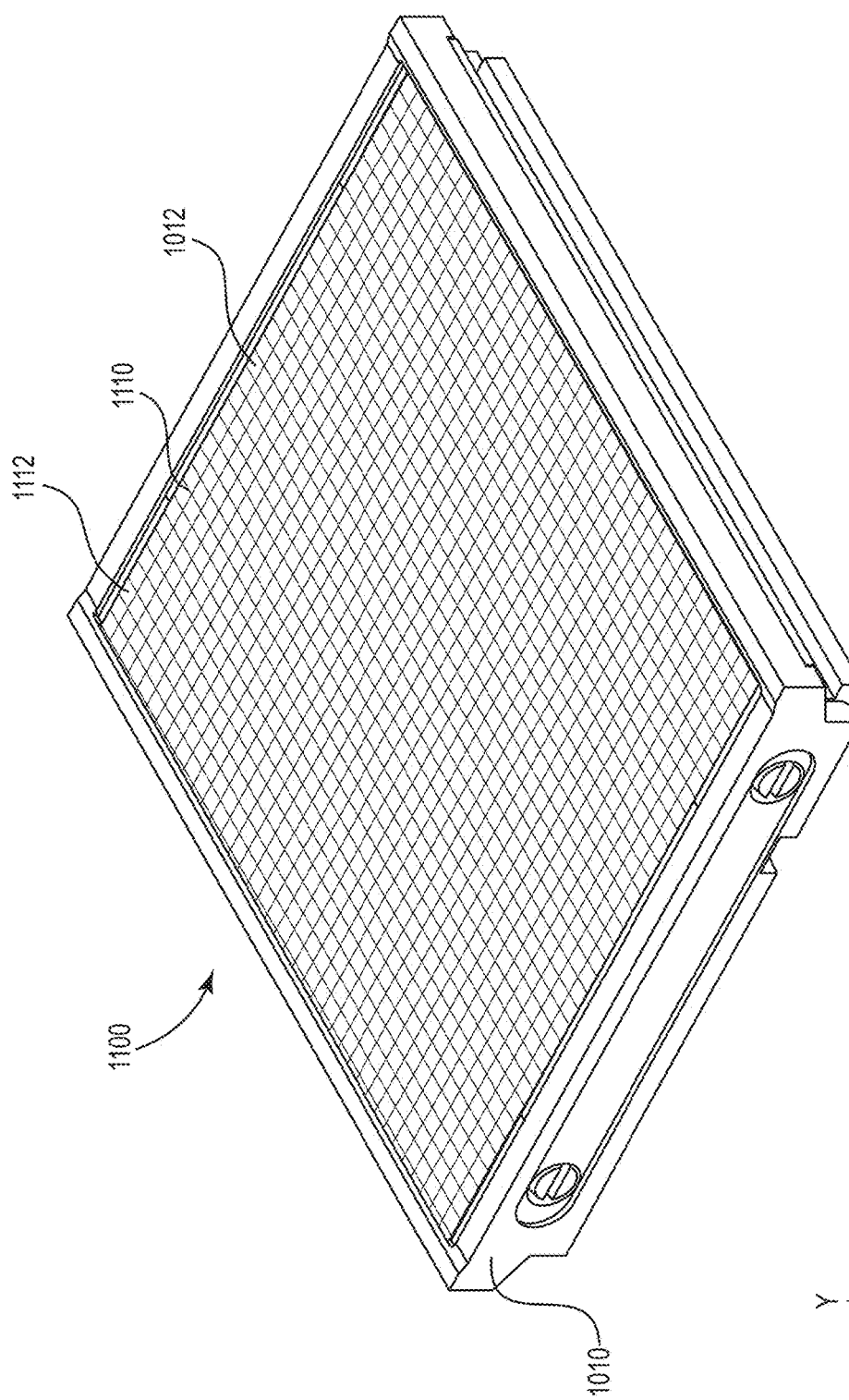
FIG. 11 illustrates a view of the slider bar carrier of FIG. 10 loaded with slider bars, showing a pattern applied to each slider bar as to how each slider bar is to subsequently be diced into individual sliders, according to various embodiments.

FIG. 11 illustrates a view 1100 of the slider bar carrier 1010 of FIG. 10 loaded with slider bars 1012, showing a pattern applied to each slider bar as to how each slider bar 1012 is to subsequently be diced into individual sliders, according to various embodiments.

The slider bar carrier 1010 discussed in FIG. 10 may support about 40 slider bars 1012 if fully loaded, as shown. Each slider bar 1012 may be composed of materials and components of approximately 60-75 non-diced sliders 1112, to be patterned along pattern lines 1110 along the z-axis. For example, a loaded slider bar carrier 1010 may have the dimensions of 53 mm (x-axis) by 60 mm (z-axis), and may be configured to produce a total of thousands of one size slider 1112 when the slider bars 1012 are separated from one another. Upon removal from slider bar carrier 1010, each slider bar 1012 is diced along the plurality of patterning lines 1110. Slider bar carrier 1010 may include vertical slider slots that assist in dicing the sliders 1112 from each slider bars 1012.

A large aperture interferometer as described herein (e.g., interferometer 210 of FIG. 2A) is preferably capable of capturing such an interferometric image of the entire surface of the slider bar carrier 410, along with flatness data of each non-diced slider 1112, whether before, after, or during a lapping process.

Figure 12:
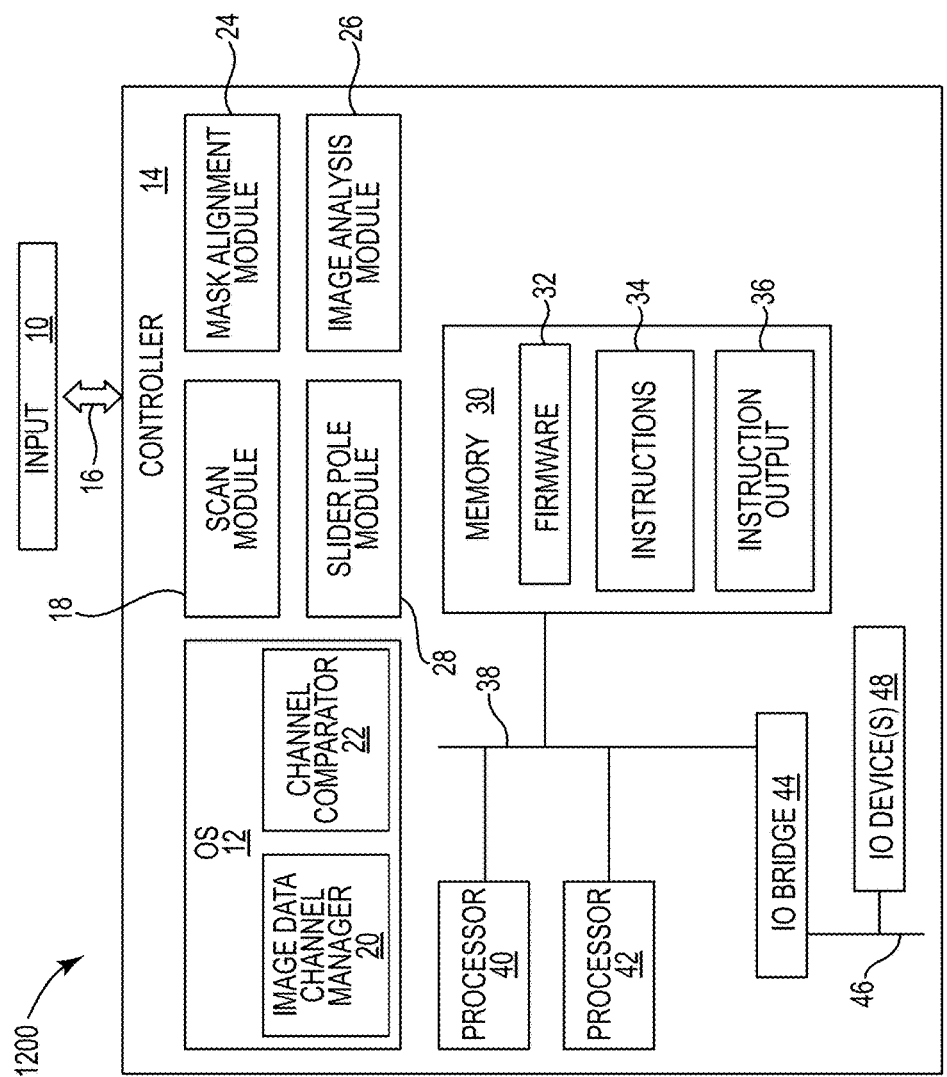
FIG. 12 is a block schematic diagram of a computer system according to embodiments.

FIG. 12 is a block schematic diagram of a computer system 1200 according to embodiments of the present disclosure.

Computer system 1200, as shown, is configured with an interface 16 to enable a controller 14 to receive a request to measure flatness of a slider surface. The controller 14 may be in communication with the large aperture interferometer (e.g., 210) through a scan module 18, according to various embodiments. The scan module 18 may be configured to control interferometric activities. The controller 14 may also facilitate implementation and performance of various other methods, as described herein. The controller 14 may include various computing components, including a central processing unit in processors 40, 42, memory 30, storage components, and be include an operating system 12 and/or firmware installed thereon. The various components of the controller 14 may be operatively or electrically connected to one another, and input/output device may be configured to interface with the controller 14 as described in more detail, below.

An input 10 may be received at interface 16. In embodiments, the interface 16 can enable controller 14 to receive, or otherwise access, the input 10 via, for example, a network (e.g., an intranet, or a public network such as the Internet), or a storage medium, such as a hard-disk drive internal or connected to controller 14. The interface can be configured for human input or other input devices 48, such as described later in regard to components of controller 14. It would be apparent to one of skill in the art that the interface can be any of a variety of interface types or mechanisms suitable for a computer, or a program operating in a computer, to receive or otherwise access or receive a source input or file.

Processors 40, 42 included in controller 14 are connected by a memory interface 38 to memory device or module 30. In embodiments, the memory 30 can be a cache memory, a main memory, a flash memory, or a combination of these or other varieties of electronic devices capable of storing information and, optionally, making the information, or locations storing the information within the memory 30, accessible to one or more processor 40, 42. Memory 30 can be formed of a single electronic (or, in some embodiments, other technologies such as optical) module or can be formed of a plurality of memory devices. Memory 30, or a memory device (e.g., an electronic packaging of a portion of a memory), can be, for example, one or more silicon dies or chips, or can be a multi-chip module package. Embodiments can organize a memory as a sequence of bit, octets (bytes), words (e.g., a plurality of contiguous or consecutive bytes), or pages (e.g., a plurality of contiguous or consecutive bytes or words).

In embodiments, computer 1200 can include a plurality of memory devices. A memory interface, such as 38, between a one or more processors 40, 42 and one or more memory devices can be, for example, a memory bus common to one or more processors and one or more memory devices. In some embodiments, a memory interface, such as 38, between a processor (e.g., 40, 42) and a memory 30 can be point to point connection between the processor and the memory, and each processor in the computer 1200 can have a point-to-point connection to each of one or more of the memory devices. In other embodiments, a processor (e.g., 40) can be connected to a memory (e.g., memory 30) by means of a connection (not shown) to another processor (e.g., 42) connected to the memory (e.g., 38 from processor 42 to memory 30).

Computer 1200 can include an input/output (I/O) bridge 44, which can be connected to a memory interface 38, or to processors 40, 42. An I/O bridge 44 can interface the processors 40, 42 and/or memory devices 30 of the computer 1200 (or, other I/O devices) to I/O devices 48 connected to the bridge 44. For example, controller 14 includes I/O bridge 44 interfacing memory interface 38 to I/O devices, such as I/O device 48. In some embodiments, an I/O bridge can connect directly to a processor or a memory, or can be a component included in a processor or a memory. An I/O bridge 850 can be, for example, a peripheral component interconnect express (PCI-Express) or other I/O bus bridge, or can be an I/O adapter.

An I/O bridge 44 can connect to I/O devices 48 through an I/O interface, or I/O bus, such as I/O bus 46 of controller 14. For example, I/O bus 822 can be a PCI-Express or other I/O bus. I/O devices 48 can be any of a variety of peripheral I/O devices or I/O adapters connecting to peripheral I/O devices. For example, I/O device 48 can be a graphics card, keyboard or other input device, a hard-disk drive, solid-state drive (SSD) or other storage device, a network interface card (NIC), etc. I/O devices 48 can include an I/O adapter, such as a PCI-Express adapter, that connects components (e.g., processors or memory devices) of the computer 1200 to various I/O devices 48 (e.g., disk drives, Ethernet networks, video displays, keyboards, mice, styli, touchscreens, etc.).

Computer 1200 can include instructions 34 executable by one or more of the processors 40, 42 (or, processing elements, such as threads of a processor). The instructions 34 can be a component of one or more programs. The programs, or the instructions 34, can be stored in, and/or utilize, one or more memory devices of computer 1200. Memory 30 can also store one or more instruction output 36. As illustrated in the example of FIG. 12, controller 14 includes a plurality of programs or modules, such as scan module 18, slider pole module 28, mask alignment module 24, and image analysis module 26. A program can be, for example, an application program, an operating system (OS) or a function of an OS, or a utility or built-in function of the computer 1200. A program can be a hypervisor, and the hypervisor can, for example, manage sharing resources of the computer 1200 (e.g., a processor or regions of a memory, or access to an I/O device) among a plurality of programs or OSes.

Programs can be "stand-alone" programs that execute on processors and use memory within the computer 1200 directly, without needing another program to control their execution or their use of resources of the computer 1200. For example, controller 14 includes (optionally) stand-alone programs in scan module 18, slider pole module 28, mask alignment module 24, and image analysis module 26. A stand-alone program can perform particular functions within the computer 1200, such as controlling, or interfacing (e.g., access by other programs) an I/O interface or I/O device. A stand-alone program can, for example, manage the operation, or access to, a memory (e.g., memory 30). A basic I/O subsystem (BIOS), or a computer boot program (e.g., a program that can load and initiate execution of other programs) can be a standalone program.

Controller 14 within computer 1200 can include one or more OS 12, and an OS 12 can control the execution of other programs such as, for example, to start or stop a program, or to manage resources of the computer 1200 used by a program. For example, controller 14 includes OS 12, which can include, or manage execution of, one or more programs, such as OS 12 including (or, managing) image data channel manager 20 and/or channel comparator 22. In some embodiments, an OS 12 can function as a hypervisor.

A program can be embodied as firmware (e.g., BIOS in a desktop computer, or a hypervisor) and the firmware can execute on one or more processors and, optionally, can use memory, included in the computer 1200. Firmware can be stored in a memory (e.g., a flash memory) of the computer 1200. For example, controller 14 includes firmware 32 stored in memory 30. In other embodiments, firmware can be embodied as instructions (e.g., comprising a computer program product) on a storage medium (e.g., a CD-ROM, DVD-ROM, flash memory, or hard-disk drive), and the computer 1200 can access the instructions from the storage medium.

In embodiments of the present disclosure, the computer 1200 can include instructions for measuring flatness of a slider surface. Controller 14 includes, for example, scan module 18, slider pole module 28, mask alignment module 24, and image analysis module 26, which can operate, in conjunction with image data channel manager 20 and channel comparator 22 to analyze images and classify artifacts by type within each image. The computer 1200 can utilize scan module 18, slider pole module 28, mask alignment module 24, and image analysis module 26 in a memory 30 of the computer 1200, such as controller 14 storing the image data, including data channels for an image, and perform cache clean-up and/or cache transmission control in memory 30.

The example computer system 1200 and controller 14 are not intended to limiting to embodiments. In embodiments, computer system 1200 can include a plurality of processors, interfaces, and inputs and can include other elements or components, such as networks, network routers or gateways, storage systems, server computers, virtual computers or virtual computing and/or I/O devices, cloud-computing environments, and so forth. It would be evident to one of skill in the art to include a variety of computing devices interconnected in a variety of manners in a computer system embodying aspects and features of the disclosure.

In embodiments, the controller 14 can be, for example, a computing device having a processor (e.g., 40) capable of executing computing instructions and, optionally, a memory 30 in communication with the processor. For example, controller 14 can be a desktop or laptop computer; a tablet computer, mobile computing device, personal digital assistant (PDA), or cellular phone; or, a server computer, a high-performance computer (HPC), or a super computer. Controller 14 can be, for example, a computing device incorporated into a wearable apparatus (e.g., an article of clothing, a wristwatch, or eyeglasses), an appliance (e.g., a refrigerator, or a lighting control), a mechanical device, or (for example) a motorized vehicle. It would be apparent to one skilled in the art that a computer embodying aspects and features of the disclosure can be any of a variety of computing devices having processors and, optionally, memory devices, and/or programs.

It is understood that numerous variations of improved manners of measuring flatness of a slider surface could be made while maintaining the overall inventive design of various components thereof and remaining within the scope of the disclosure. Numerous alternate design or element features have been mentioned above.

As used herein, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

Although certain features are described generally herein relative to particular embodiments of the disclosure, it is understood that the features are interchangeable between embodiments to arrive at methods of measuring flatness of a slider surface Reference is made herein to the accompanying drawings that form a part hereof and in which are shown by way of illustration at least one specific embodiment. The detailed description provides additional specific embodiments. It is to be understood that other embodiments are contemplated and may be made without departing from the scope or spirit of the present disclosure. The detailed description, therefore, is not to be taken in a limiting sense. While the present disclosure is not so limited, an appreciation of various aspects of the disclosure will be gained through a discussion of the examples provided.

What is claimed is:

1. A method of measuring one or more surface features, comprising:
receiving an image of a surface of a slider bar from an interferometer, wherein the slider bar includes at least two sliders selected from a plurality of sliders, and wherein the image includes image data according to at least two image data channels for a slider bar surface and the included at least two sliders;
generating a slider bar map of the surface of the slider bar based upon the image data of the image, wherein the slider bar map includes at least two data channels related to the slider bar;
ascertaining a plurality of individual slider surface maps based at least in part on a number of sliders included on the slider bar, wherein the ascertaining is also based upon the slider bar map having the at least two data channels; and
segmenting the slider bar map according to the plurality of individual slider surface maps.

2. The method of claim 1, wherein a first slider of the plurality of sliders is positioned proximate to a first slider pole and a second slider of the plurality of sliders is positioned proximate to a second slider pole.

3. The method of claim 2, wherein the first slider pole and the second slider pole each include a read element and a write element of a respective slider.

4. The method of claim 2, further comprising:
positioning a cropping mask relative to the slider bar to define an analysis region; and
adjusting at least one of a position or a size and shape of the cropping mask based on at least a location of the first slider pole and a location of the second slider pole;
wherein the adjusting uses pattern recognition to identify the location of the first slider pole and the location of the second slider pole.

5. The method of claim 4, wherein the adjusting is also based on the slider bar map.

6. The method of claim 1, further comprising:
dicing the slider bar into individual sliders based on the segmented bar map.

7. The method of claim 1, wherein the adjusting the at least of the position or the size and shape of the cropping mask based on at least the location of the first slider pole and the location of the second slider pole in terms of slider-to-slider pitch of the plurality of sliders along a length of the slider bar.

8. The method of claim 1, wherein the at least two data channels includes a first surface height channel, and either a second surface intensity or a modulation channel.

9. The method of claim 1, wherein the ascertaining the plurality of individual slider surface maps is based upon the slider bar map having at least three data channels, wherein the at least three data channels includes a first surface height channel, a second surface intensity channel, and a third surface modulation channel.

10. An apparatus, comprising:
a processor operatively coupled to a memory;
a large-aperture interferometer;
a slider cropping mask configured to be positioned proximate to a slider bar;
a controller, wherein the controller is configured to:
receive an image of a surface of the slider bar from the interferometer, wherein the slider bar includes at least two sliders selected from a plurality of sliders, and wherein the image includes image data according to at least two image data channels for a slider bar surface and the included at least two sliders;
generate a slider bar map of surface of the slider bar based upon the image data of the image, wherein the slider bar map includes at least two data channels related to the slider bar;
ascertain a plurality of individual slider surface maps based at least in part of a number of sliders included on the slider bar, wherein the ascertaining is also based upon the slider bar map having the at least two data channels; and
segment the slider bar map according to the plurality of individual slider surface maps.

11. The apparatus of claim 10, wherein a first slider is positioned proximate to a first slider pole and a second slider is positioned proximate to a second slider pole.

12. The apparatus of claim 11, wherein the first slider pole and the second slider pole each include a read element and a write element of a respective slider.

13. The apparatus of claim 11, wherein the controller is further configured to:
adjust at least one of a position or a size and shape of the cropping mask based on at least a location of the first slider pole and a location of the second slider pole;
wherein the adjusting uses pattern recognition to identify the location of the first slider pole and the location of the second slider pole, and wherein the adjusting is also based on the slider bar map.

14. The apparatus of claim 10, wherein the at least two data channels includes a first surface height channel, and either a second surface intensity or a modulation channel.

15. The apparatus of claim 10, wherein the slider bar map includes data related to the slider bar according to at least three data channels, and wherein the ascertaining the plurality of individual slider surface maps is based upon the slider bar map having the at least three data channels, and wherein the at least three data channels includes first surface height channel, a second surface intensity channel, and a third surface modulation channel.

16. A computer program product for measuring slider surface features, comprising: a computer-readable storage device having a computer-readable program stored therein, wherein the computer-readable program, when executed on a computing device improves the computing device and causes the computing device to:
receive an image of a surface of the slider bar from a large-aperture interferometer, wherein the slider bar includes at least two sliders selected from a plurality of sliders, and wherein the image includes image data according to at least two image data channels for a slider bar surface and the included at least two sliders;
generate a slider bar map of a surface of the slider bar based upon the image data of the image, wherein the slider bar map includes at least two data channels related to the slider bar;
ascertain a plurality of individual slider surface maps based at least in part of a number of sliders included on the slider bar, wherein the ascertaining is also based upon the slider bar map having the at least two data channels; and
segment the slider bar map according to the plurality of individual slider surface maps.

17. The computer program product of claim 16, wherein a first slider is positioned proximate to a first slider pole and a second slider is positioned proximate to a second slider pole.

18. The computer program product of claim 17, wherein the computer-readable program further causes the computing device to:
   position a cropping mask relative to the slider bar; and
   adjust at least one of a position or a size and shape of the cropping mask based on at least a location of the first slider pole and a location of the second slider pole;
   wherein the adjusting uses pattern recognition to identify the location of the first slider pole and the location of the second slider pole; and wherein the adjusting is also based on the slider bar map.

19. The computer program product of claim 16, wherein the at least two data channels includes a first surface height channel, and a second surface intensity or modulation channel.

20. The computer program product of claim 16, wherein the slider bar map includes data related to the slider bar according to at least three data channels, wherein the ascertaining the plurality of individual slider surface maps is based upon the slider bar map having the at least three data channels, and wherein the at least three data channels includes first surface height channel, a second surface intensity channel, and a third surface modulation channel.

\* \* \* \* \*